(12) United States Patent
Nishihara et al.

(10) Patent No.: US 9,466,330 B1
(45) Date of Patent: Oct. 11, 2016

(54) CORRECTION VALUE CALCULATING METHOD, MANUFACTURING METHOD OF DISK DRIVE, AND DISK DRIVE

(71) Applicant: Kabushiki Kaisha Toshiba, Minato-ku, Tokyo (JP)

(72) Inventors: Ryuzo Nishihara, Yokohama Kanagawa (JP); Takuya Ogawa, Machida Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/009,528

(22) Filed: Jan. 28, 2016

Related U.S. Application Data

(60) Provisional application No. 62/254,419, filed on Nov. 12, 2015.

(51) Int. Cl.
  *G11B 21/12* (2006.01)
  *G11B 5/54* (2006.01)
  *G11B 5/55* (2006.01)

(52) U.S. Cl.
  CPC .................. *G11B 21/12* (2013.01); *G11B 5/54* (2013.01); *G11B 5/5565* (2013.01)

(58) Field of Classification Search
  None
  See application file for complete search history.

(56) References Cited

U.S. PATENT DOCUMENTS

| | | | | |
|---|---|---|---|---|
| 6,563,660 B1* | 5/2003 | Hirano | ................... | G11B 21/22 360/75 |
| 6,661,598 B2* | 12/2003 | Kusumoto | ............... | G11B 5/54 360/75 |
| 6,754,027 B2* | 6/2004 | Hirano | ................... | G11B 21/22 360/75 |
| 6,765,746 B2* | 7/2004 | Kusumoto | ............... | G11B 5/54 360/75 |
| 7,031,093 B2* | 4/2006 | Suzuki | ............... | G11B 5/59605 360/75 |
| 7,046,475 B2* | 5/2006 | Hosokawa | ............. | G11B 21/12 360/75 |
| 7,106,541 B2* | 9/2006 | Bruner | .................. | G06F 3/0605 360/75 |
| 7,277,253 B2* | 10/2007 | Yamashita | ............... | G11B 5/54 360/75 |
| 7,483,233 B2* | 1/2009 | Kim | ...................... | G11B 21/12 360/75 |
| 7,864,480 B2* | 1/2011 | Ito | ............................ | G11B 5/54 360/75 |
| 7,920,353 B2* | 4/2011 | Ueda | ...................... | G11B 21/12 360/75 |
| 8,000,055 B2* | 8/2011 | Ito | ............................ | G11B 5/54 360/75 |
| 8,072,703 B1* | 12/2011 | Calaway | .................. | G11B 5/54 360/75 |
| 2001/0036031 A1 | 11/2001 | Hirano et al. | | |
| 2003/0002196 A1 | 1/2003 | Kusumoto et al. | | |
| 2008/0030891 A1* | 2/2008 | Kim | ..................... | G11B 5/5526 360/78.06 |
| 2009/0015961 A1* | 1/2009 | Kusumoto | ............... | G11B 5/54 360/75 |
| 2013/0070368 A1* | 3/2013 | Takakura | ............... | G11B 21/12 360/75 |
| 2015/0262599 A1* | 9/2015 | Koyama | ................. | H02P 6/182 318/5 |

* cited by examiner

*Primary Examiner* — Wayne Young
*Assistant Examiner* — James L Habermehl
(74) *Attorney, Agent, or Firm* — White & Case LLP

(57) ABSTRACT

In a correction value calculating method according to an embodiment, a first distance is measured as a distance actually traveled by a head while the head is unloaded. Meanwhile, a first correction value is generated. The first correction value is used to correct a first torque value exerted on a coil when the head is unloaded. Then, a second torque value is obtained with the first correction value. The second torque value is exerted on the coil when the head is actually unloaded. Based on the second torque value, a second distance traveled by the head is calculated. Then, a second correction value used to correct the second torque value is calculated based on the first correction value, and the ratio of the first distance to the second distance.

20 Claims, 7 Drawing Sheets

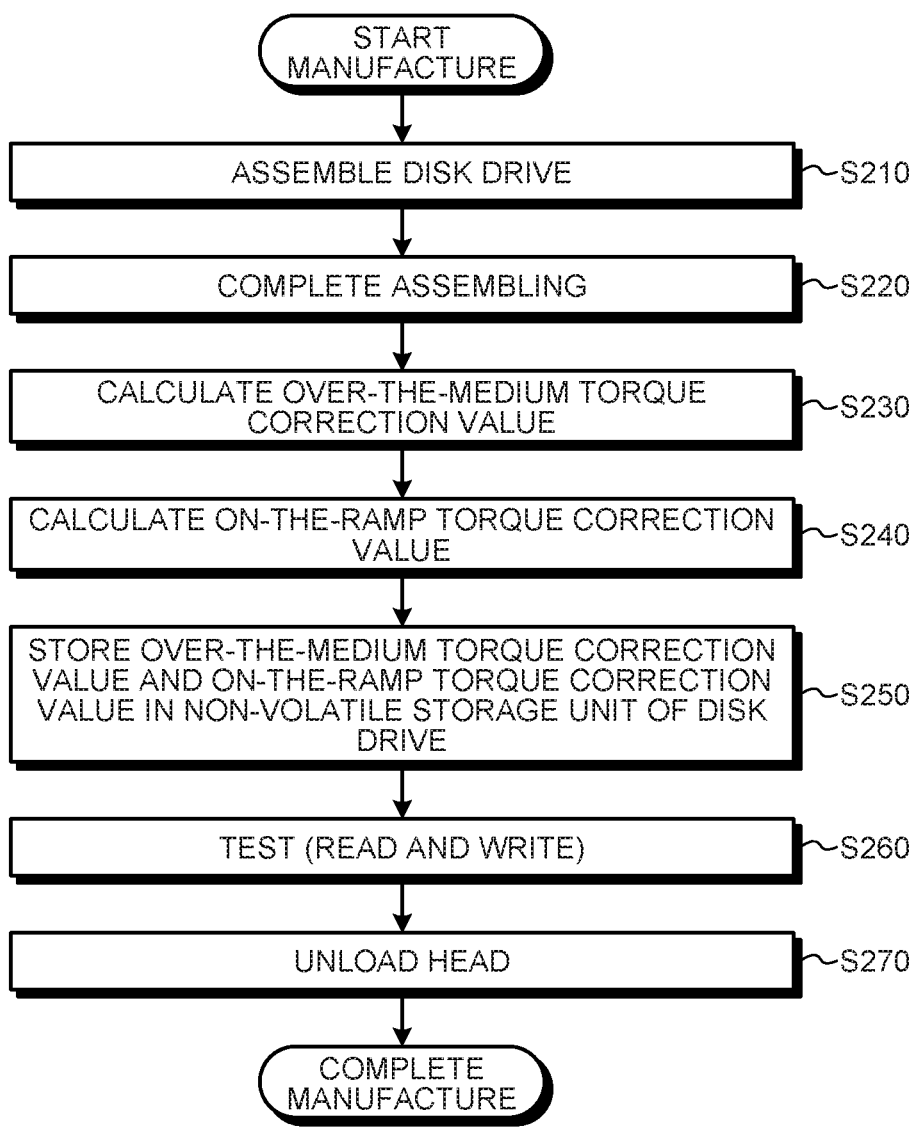

CORRECTION VALUE CALCULATING METHOD, MANUFACTURING METHOD OF DISK DRIVE, AND DISK DRIVE

CROSS-REFERENCE TO RELATED APPLICATIONS

This application is based upon and claims the benefit of priority from U.S. Provisional Application No. 62/254,419, filed on Nov. 12, 2015; the entire contents of which are incorporated herein by reference.

FIELD

The present embodiment generally relates to a correction value calculating method, a manufacturing method of a disk drive, and the disk drive.

BACKGROUND

Some disk drives are provided with a ramp (inclined) member, which is used to retract a head, near the outer periphery of the disk drive. It is desirable in such a disk drive to accurately control the head at a desired velocity on the ramp member, for example, in order to prevent the head from hitting a disk. Thus, conventionally, a torque exerted on a coil for driving the head is measured over the disk. Then, a torque when the head moves across the disk is corrected based on the measured torque. However, it is not clear in the correction method if the torque is corrected properly when the head moves on the ramp. This makes it difficult to accurately control the head at a desired velocity on the ramp.

BRIEF DESCRIPTION OF THE DRAWINGS

FIG. 7 is a flowchart of a process for manufacturing the disk drive according to the embodiment.

DETAILED DESCRIPTION

The present embodiment provides a correction value calculating method. In the correction value calculating method, a first distance, which is actually traveled by a head on a ramp member while the head is unloaded, is measured. A first torque value, which is exerted on a coil when the head is unloaded, is obtained. The coil is used to drive the head. The first torque value is obtained while the head moves on the ramp member. A first correction value used to correct the first torque value is generated. Then, the head is actually unloaded with the first correction value. A second torque value, which is exerted on the coil when the head is actually unloaded, is obtained. The second torque value is obtained while the head moves on the ramp member. A second distance, which is traveled by the head based on the second torque value, is calculated. Then, a second correction value used to correct the second torque value is calculated based on the first correction value, and the ratio of the first distance to the second distance.

A correction value calculating method, manufacturing method of a disk drive, and the disk drive according to the embodiment will be described in detail hereinafter with reference to the accompanying drawings. Note that the present invention is not limited to the embodiment.

Embodiment

Figure 1:
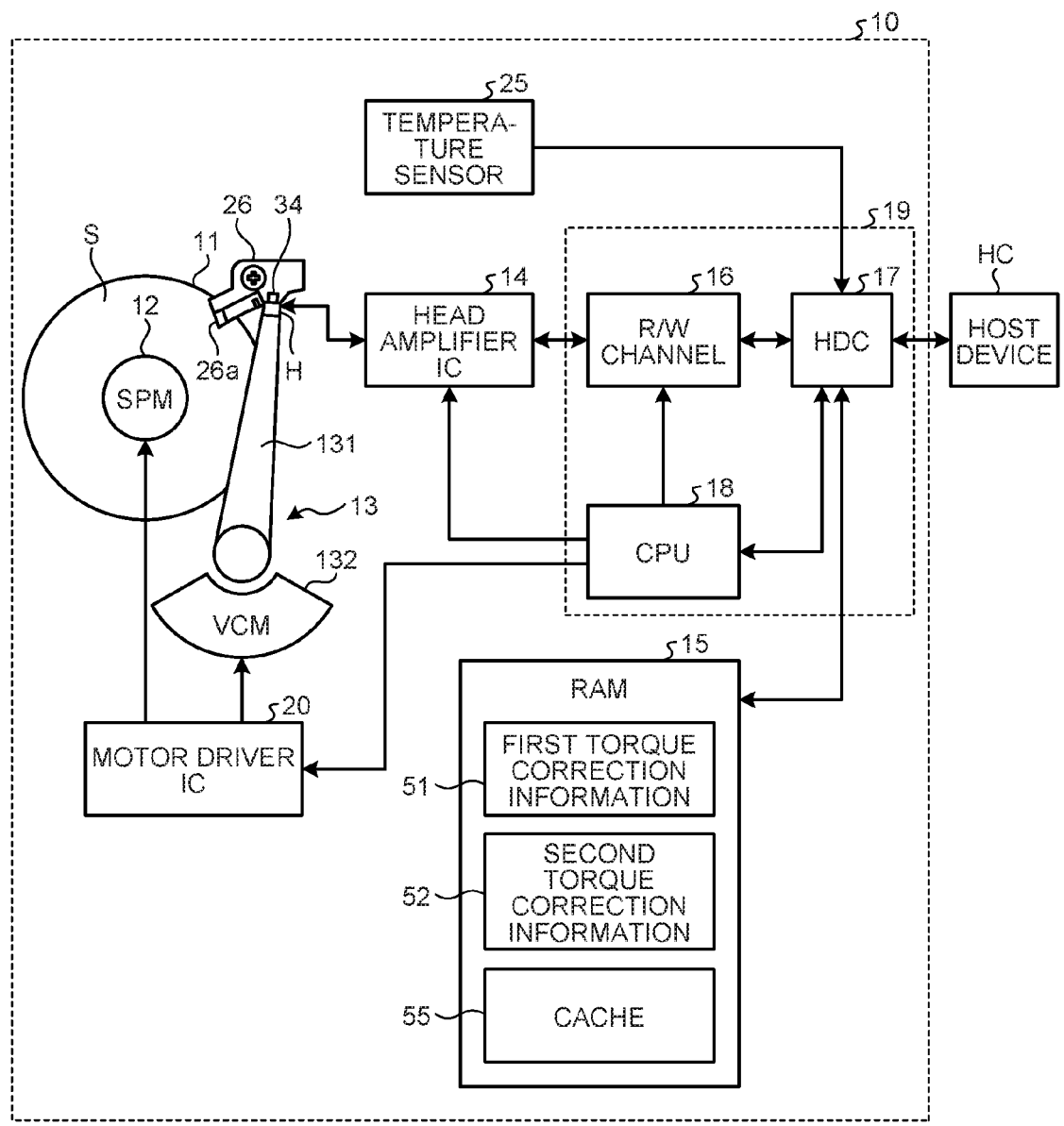
FIG. 1 is a schematic diagram of an exemplary configuration of a disk drive of an embodiment.

FIG. 1 is a schematic diagram of a configuration of a disk drive according to the embodiment. A disk drive 10 is, for example, a Hard Disk Drive (HDD), and is used as an external storage device (such as a magnetic recording device) of a host device HC. The disk drive 10 is connectable to the host device HC. The disk drive 10 has a function to control the loading and unloading in which a head H moves up and down on a ramp member 26.

In the present embodiment, an approximate expression that indicates a correspondence relationship between a position of the head on the ramp member 26, and a torque (torque value) exerted on a VCM coil when the head is at the position is generated. A correction value (hereinafter, referred to as a torque correction value) used to correct the torque of the VCM coil is generated based on the generated approximate expression for each position of the head on the ramp member 26. The torque correction value is a value used to correct a force exerted on the VCM coil when a current of 1A flows. In the disk drive 10, the generated torque correction value is used to unload the head H. A travel distance traveled by the head H on the ramp member 26 when the head H is unloaded is calculated from the back electromotive force (BEMF) of a VCM 132. Then, a ratio of the travel distance to a design distance that is previously measured is calculated. A new torque correction value is obtained by multiplying the ratio by the torque correction value. The disk drive 10 moves the head H in accordance with the calculated new torque correction value after shipment.

The disk drive 10 stores the torque correction values (the torque correction values while the head H is on the ramp) linked to the positions of the head H on the ramp member 26. The torque correction values may be a table that indicates a correspondence relationship between the torque and the position of the head H on the ramp member 26, or may be the approximate expression described above. Note that the approximate expression or the table will be described as first torque correction information 51 hereinafter. The first torque correction information 51 is information (function) in which the torque correction values corresponding to the positions of the head H on the ramp member 26 are set. The disk drive 10 extracts a torque correction value corresponding to a position of the head H on the ramp member 26 from the first torque correction information 51 to use the torque correction value. Note that the torque correction value while the head H is on the ramp is referred to as merely a torque correction value.

The disk drive 10 further stores over-the-medium torque correction values. The over-the-medium torque correction value is linked to the position of the head H while the head H is over the disk 11. The over-the-medium torque correction values may be a table that indicates a correspondence relationship between the torque and the position of the head H over the disk 11, or may be an approximate expression. Note that the approximate expression or the table will be described as second torque correction information 52 hereinafter. The second torque correction information 52 is information (function) in which the torque correction values corresponding to the positions of the head H over the disk 11 are set. The disk drive 10 extracts a torque correction value corresponding to a position of the head H over the disk 11 from the second torque correction information 52 to use the torque correction value.

The disk drive 10 includes the disk 11 working as a non-volatile storage device, a spindle motor (SPM) 12, a Head Stack Assembly (hereinafter, referred to as HSA) 13, and a head amplifier integrated circuit (hereinafter, referred to as a head amplifier IC) 14.

The disk drive 10 further includes a Random Access Memory (hereinafter, referred to as RAM) 15, a read/write channel (hereinafter, referred to as R/W channel) 16, a Hard Disk Controller (hereinafter, referred to as HDC) 17, and a Central Processing Unit (hereinafter, referred to as CPU) 18 that is an exemplary processor. The disk drive 10 further includes a motor driver IC (SVC) 20, and a temperature sensor 25.

The disk 11 includes a recording surface S on which data is recorded. The disk 11 is turned and driven by the spindle motor 12. The disk drive 10 is provided with a plurality of disks (platters) 11. A physical address that is the positional information indicating the physical position on the recording surface S is assigned to each of the recording surfaces S in the disk drive 10. A physical address is assigned, for example, to each head H and each sector. The spindle motor 12 is driven by the current or voltage supplied from the motor driver IC 20.

The HSA 13 includes the head H, a head suspension 131, and a Voice Coil Motor (VCM) 132 that drives the head H. The head H is provided to each of the recording surfaces S of the disks 11. The head H includes a write head used to write data to the disk 11, and a read head used to read data from the disk 11.

The head suspension 131 and VCM 132 form an actuator. The actuator controls the head H supported by the head suspension 131 to move to a predetermined position on the recording surface S of the disk 11 by driving the VCM 132. Such a configuration of the HSA 13 enables the head H to move in a radial direction of the recording surface S of the disk 11.

The tab 34 is attached near the head H, for example, attached to the tip of the head suspension (arm) 131. The tab 34 is movable in a radial direction of the disk 11. The ramp member 26 is placed near the outer periphery of the disk 11 on the travel path of the tab 34.

A ramp (inclination) 26a extending along the travel path of the head H is formed in the ramp member 26. The ramp member 26 includes a plurality of inclined portions and flat portions, and a parking area. The parking area is used to retract the head H from a position on the recording surface of the disk 11 when the head H is unloaded. The ramp 26a includes a surface on which the head H moves farther away from a virtual plane including the surface of the disk 11 as the head H moves farther away from the rotation shaft of the disk 11.

When being unloaded, the head H passes through the disk 11 and the ramp member 26 in order of the following positions P1 to P7. A first inclined portion is the ramp 26a, and a second inclined portion is the parking area.

The position P1: a reference position on the disk 11

The position P2: a start position of the first inclined portion of the ramp member 26

The position P3: a limit position of the range in which a signal on the disk 11 can be read The position P4: a start position of the flat part of the ramp member 26 (an end position of the first inclined portion)

The position P5: an end position of the flat portion of the ramp member 26 (the start position of the second inclined portion)

The position P6: an end position of the second inclined portion of the ramp member 26 (the start position of the parking area)

The position P7: an end position of the parking area

Thus, when the head H is sought in a direction in which the head H moves farther away from the center (the rotation shaft) of the disk 11, the tab 34 makes a contact with the ramp member 26. After that, the tab 34 moves up on the ramp 26a and stops in accordance with the position of an outer stopper. This retracts (unloads) the head H from a position near the surface of the disk 11 to the ramp member 26.

On the other hand, when the head H is sought in a direction in which the head H approaches the center (the rotation shaft) of the disk 11, the tab 34 moves down on the ramp 26a. This guides (loads) the head H to a position near the surface of the disk 11 from the ramp member 26. The ramp member 26 and the tab 34 work as a loading and unloading mechanism by cooperating with each other.

As described above, the head H moves from the disk 11 to the ramp member 26 when being unloaded, and moves from the ramp member 26 to the disk 11 when being loaded.

The head suspension 131 is provided to each of the head H so as to support the head H. The VCM 132 is driven by the current or voltage supplied from the motor driver IC 20. The VCM 132 includes a coil (VCM coil) so that controlling the force (torque) exerted on the VCM coil controls the velocity of the head H.

The VCM coil is wound around the arm-shaped head suspension 131 in the VCM 132. For example, the force (F) exerted on the VCM is shown as an expression (1) when the current flowing through the VCM coil is I, the magnetic flux density is B, and the length of the VCM coil is L.

$$F=IBL(N) \quad (1)$$

Thus, when the torque exerted on the VCM coil is BL, BL=F/I (N/A) holds. BL that is the torque is expressed, when the input current to the VCM 132 and the output current are used, as BL=the output current/the input current. Then, the torque correction value is 1/BL. The torque is measured at each of the positions of the head H on the ramp member 26. The measured positions are linked to the measured results and stored.

The disk drive 10 can detect the velocity of the head H based on the back electromotive voltage of the VCM 132 when the head H is moved. The disk drive 10 can calculate the distance from the start position from which the constant velocity control stars to the end position at which the constant velocity control ends in accordance with the variation in velocity of the head H, a time T1 when the head H hits (collide with) the ramp 26a, and a time T2 when the head H reaches the parking area. The time T1 is the time when the collision of the head H with the ramp 26a changes the velocity. The time T2 is the time when the arrival of the head H at the parking area changes the velocity. The range from the start position to the end position of the constant velocity control is the range in which the head H is controlled at a constant velocity on the ramp member 26.

The disk drive 10 moves the head H while correcting the torque exerted on the VCM coil in order to move the head H at a desired velocity (for example, at a constant velocity). In the disk drive 10, the motor driver IC 20 controls the current and voltage to be supplied to the VCM 132 in accordance with the first torque correction information 51.

The torque correction value in the first torque correction information 51 is used to correct the torque (BL) exerted on the VCM coil when the head H is unloaded to the ramp member 26. The disk drive 10 can store the design value previously measured as the torque, or the disk drive 10 can actually measure the torque.

The first torque correction information 51 is obtained by adjusting reference torque correction information (hereinafter, referred to as initial correction information 51A) in response to an actual operation of the head H. Note that the initial correction information 51A is omitted from FIG. 1 because the initial correction information 51A is sometimes deleted after being used. When the first torque correction information 51 is calculated, the head H is unloaded with the initial correction information 51A. In accordance with the temporal variation in torque (velocity of the head H) when the head H is unloaded, the travel distance (the detected distance Lb) traveled by the head H on the ramp member 26 is calculated. Then, the initial correction information 51A is adjusted in accordance with the ratio of the travel distance (a design distance Lt) traveled by the head H and measured with a predetermined measuring instrument to the detected distance Lb. Thus, the first torque correction information 51 is calculated from the initial correction information 51A. The initial correction information 51A can be an approximate expression or a table, similarly to the first torque correction information 51. When the initial correction information 51A is an approximate expression, the initial correction information 51A is an approximate expression similar to the expression of the first torque correction information 51. When the initial correction information 51A is a table, the initial correction information 51A is a table similar to the table of the first torque correction information 51.

The head amplifier IC 14 sends the head H a write signal (a current) in accordance with the write data input from the R/W channel 16. The head amplifier IC 14 amplifies the read signal output from the head H (the read data read from the disk 11 with the head H), and transmits the amplified signal to the R/W channel 16.

The temperature sensor 25 detects a device temperature that is a temperature near the disk drive 10. The temperature sensor 25 detects the device temperature at predetermined time intervals and sends the detected device temperature to the HDC 17.

The RAM 15 is used as a temporal storage region, and is a volatile memory such as a Dynamic RAM (DRAM) or a Static RAM (SRAM). The RAM 15 stores the first torque correction information 51, the second torque correction information 52, and the data in the cache 55 (the cache data).

The cache 55 is a cache memory (buffer) used to read and write data between the host device HC and the disk 11. The cache 55 temporarily stores the data between the host device HC and the disk 11 before the data is stored in the disk 11, or before the data is transmitted to the host device HC.

When the disk drive 10 is powered on, the information is read from the disk 11 and stored in the RAM 15. The information stored in the RAM 15 is overwritten as necessary.

The first torque correction information 51 in the information stored in the RAM 15 is previously generated and stored in the disk 11 before the disk drive 10 is used (in a stage of manufacture). In the present embodiment, the first torque correction information 51 calculated in accordance with the ratio of the design distance Lt to the detected distance Lb is written in the disk 11. The first torque correction information 51 is stored in the RAM 15 when the disk drive 10 is powered on. Note that the initial correction information 51A can temporarily be stored in the disk 11 or the RAM 15. Then, the initial correction information 51A can be deleted from or can remain in the disk 11 after being used (in a stage of manufacture).

The cache 55 includes a write cache and a read cache. The write cache temporarily stores the data to be written in the disk 11 in accordance with a write command instructing the writing of the write data to the disk 11. The read cache temporarily stores the data to be read from the disk 11 in accordance with a read command instructing the reading of the read data from the disk 11.

In the embodiment, the write command includes a start Logical Block Address (hereafter, referred to as LBA), and the write data length. The logical sector in which the write data is written starts from the start Logical Block Address in the logical sector managed with the disk 11. The read command includes a start LBA of the logical sector in which the read data to be read is stored in the logical sector managed with the disk 11, and the read data length.

The HDC 17 is a communication interface that enables the communication with the host device HC. The HDC 17 stores the data from the host device HC in the disk 11 after storing the data in the cache 55.

When receiving the write command from the host device HC, the HDC 17 stores the write command in the RAM 15, stores the write data in the cache 55 of the RAM 15, and returns a response to the host device HC after the writing process is completed. When receiving the read command from the host device HC, the HDC 17 stores the read command in the RAM 15, and returns the read data stored in the cache 55 to the host device HC in the reading process.

The CPU 18 is a main controller of the disk drive 10, and performs various processes including a control process for controlling the writing of the write data and the reading of the read data with the head H, and a servo control process for controlling the position of the head H on the recording surface S of the disk 11. The CPU 18 performs a process for generating the initial correction information 51A or the first torque correction information 51. Note that the CPU 18 performs the various processes with a program stored in non-volatile storage media such as a Read Only Memory (ROM) (not illustrated) and the disk 11.

The motor driver IC 20 controls electricity (power) in the disk drive 10. The motor driver IC 20 performs the power control and the control on the spindle motor (SPM) 12. The motor driver IC 20 receives the electrical power from the host device HC, and performs the power control for supplying the power based on the received electrical power to each unit of the disk drive 10. The motor driver IC 20 controls the rotation of the spindle motor 12. The motor driver IC 20 controls the driving of the VCM 132.

In the disk drive 10, the R/W channel 16, the HDC 17, and the CPU 18 are incorporated in the integrated circuit 19, which is referred to as a System on Chip (SoC) and integrated on a chip. The integrated circuit 19 functions as a controller in a board sense.

The disk drive 10 in the present embodiment calculates the torque correction value based on the BEMF when the head H is unloaded. The disk drive 10 unloads the head H using the initial correction information 51A.

The initial correction information 51A is, for example, an approximate expression indicating the correspondence relationship between the torque and the position of the head H on the ramp member 26 (hereinafter, referred to as a head position). For example, a first position of the head H on the ramp member 26 is linked to a first torque, and an nth (the n is a natural number) position of the head H on the ramp member 26 is linked to an nth torque in the initial correction information 51A. Accordingly, the disk drive 10 drives the VCM 132 at the first torque when the head H is at the first position, and drives the VCM 132 at the nth torque when the head H is at the nth position.

The BEMF when the head H is unloaded is input to the CPU 18. The CPU 18 calculates the velocity of the head H (the head velocity) based on the input BEMF. The CPU 18 calculates the distance from the start position of the first inclined portion to the end position of the second inclined portion (the distance traveled by the head H on the ramp member 26, namely, the detected distance Lb of the head H in accordance with the variations in velocity of the head H).

The CPU 18 calculates the detected distance Lb based on the time T1 when the head H hits the ramp 26a, and the time T2 when the head H reaches the parking area. Specifically, the CPU 18 calculates the sum of all the head velocities detected between the times T1 and T2. Then, the CPU 18 multiplies the sum by the sample periods in which the head velocities are detected. In other words, the CPU 18 integrates the head velocity over the time between the times T1 and T2. In such a way, the CPU 18 calculates the detected distance Lb.

The CPU 18 calculates the ratio of the design distance Lt to the detected distance Lb, and then calculates the square root of the calculated ratio. The CPU 18 calculates the first torque correction information 51 by multiplying the initial correction information 51A by the calculated square root. The CPU 18 stores the calculated first torque correction information 51 in the disk 11 of the disk drive 10.

Figure 2:
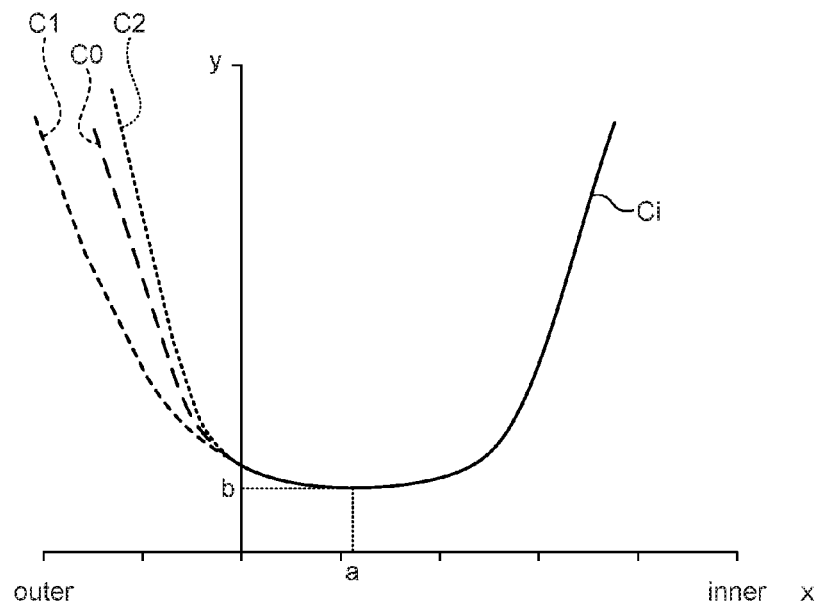
FIG. 2 is an explanatory diagram of initial correction information and torque correction information.

FIG. 2 is an explanatory diagram of the initial correction information and the torque correction information. The initial correction information 51A and the first torque correction information 51 are a quadratic approximate expression in the embodiment. Note that, however, the initial correction information 51A and the first torque correction information 51 can be an expression other than a quadratic approximate expression.

The positions of the head H in a radial direction of the disk are shown on the horizontal axis x of the graph illustrated in FIG. 2. The torque correction values are shown on the vertical axis y. The plus direction on the horizontal axis is the direction toward the disk 11 (inner side), and the minus direction is the direction toward the ramp member 26 (outer side). Then, a coordinate "a" is the boundary between the disk 11 and the ramp member 26. Thus, the torque is corrected with the over-the-medium torque correction value, which is used when the head H is on the disk 11, when the coordinate is larger than the coordinate a. The torque is corrected with the torque correction value, which is used when the head H is on the ramp member 26, when the coordinate is smaller than or equal to the coordinate a.

The over-the-medium torque correction value (the second torque correction information 52) that is used when the head H is on the disk 11 is an approximate expression Ci. The approximate expression Ci is, for example, the following expression (2).

$$y = k0(x-a)^2 + b, x > 0 \quad (2)$$

The initial correction information 51A that is used when the head H is on the ramp member 26 is an approximate expression C0. The approximate expression C0 is, for example, the following expression (3).

$$y = k0(x-a)^2 + b, x \leq 0 \quad (3)$$

The k0 indicates the inclination in the initial correction information 51A. The "b" is torque offset. The expression (3) is the expression (2) inversed with x=a. In other words, the function in the expression (3) used when the head H is on the ramp member 26 is identical to the function in the expression (2) used when the head H is on the disk 11.

The approximate expression C1 or C2 is exemplary first torque correction information 51. The approximate expression C1 or C2 is, for example, the following expression (4).

$$y = k(x-a)^2 + b, k = k0 \times (Lt/Lb)^{(1/2)}, x \leq 0 \quad (4)$$

The k is the inclination in the first torque correction information 51.

As described above, the CPU 18 calculates the first torque correction information 51 by multiplying the initial correction information 51A by $(Lt/Lb)^{(1/2)}$. The velocity corresponding to the BEMF is inversely proportional to the torque, and the travel distance traveled by the head H is the value of integral of the velocity of the head H. Thus, multiplying the initial correction information 51A by $(Lt/Lb)^{(1/2)}$ increases the accuracy in the first torque correction information 51.

Note that the torque sometimes varies abnormally when the torque correction value is switched between the torque correction value when the head H is on the disk 11 and the torque correction value when the head H is on the ramp member 26. In such a case, the torque correction value between the first and Nth can be multiplied by $(M/N)^{(1/2)}$ of the Nth sample. In such a case, the N is a natural number, and the M is a natural number between one and N. For example, when N=4 holds, the torque correction value of the first sample is multiplied by $(1/4)^{(1/2)}$, the torque correction value of the second sample is multiplied by $(2/4)^{(1/2)}$, the torque correction value of the third sample is multiplied by $(3/4)^{(1/2)}$, and the torque correction value of the fourth sample is multiplied by $(4/4)^{(1/2)}$.

Figure 3:
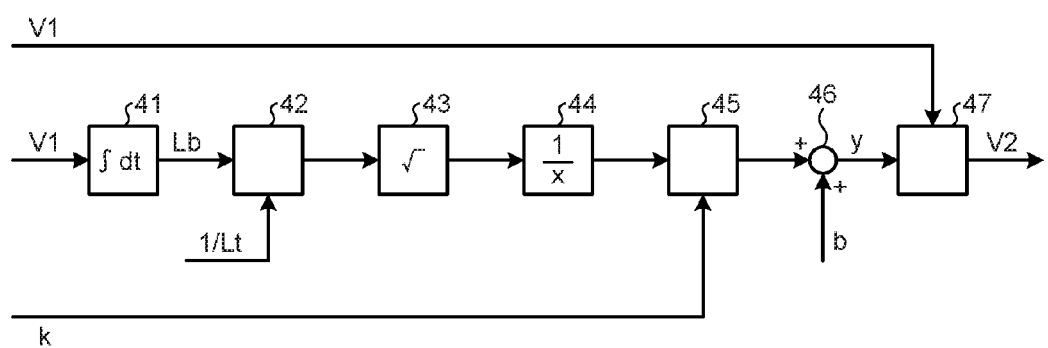
FIG. 3 is an explanatory diagram of a correction of the velocity of a head.

FIG. 3 is an explanatory diagram of correction of the velocity of the head. In the disk drive 10, a target velocity Ta described below is set to move the head H. The target velocity Ta is a desired velocity to move the head H at a constant velocity when the head H is unloaded. The head H is controlled to move at the target velocity Ta when the head H moves in a predetermined range (the times T1 to T2) while the head H is unloaded.

For example, when the head H moves at a velocity V1 while the head H is unloaded, the CPU 18 moves the head at a velocity V2 with the process illustrated in FIG. 3. By this process, the disk drive 10 makes the travel velocity of the head H approach the target velocity Ta. The CPU 18 has functions as an integration circuit 41, a multiplication circuit 42, a square-root operation circuit 43, a reciprocal operation circuit 44, a multiplication circuit 45, and an adder circuit 46.

When the head velocity is controlled, the CPU 18 inputs the velocity V1 into the integration circuit 41. The integration circuit 41 calculates the detected distance Lb by integrating the velocity V1 with respect to the time when the head H moves at a constant velocity. The detected distance Lb is input in the multiplication circuit 42. An inverse (1/Lt) of the design distance Lt is also input in the multiplication circuit 42. Then, the multiplication circuit 42 calculates (Lt/Lb) and inputs the calculated result in the square-root operation circuit 43.

The square-root operation circuit 43 calculates the square root $(Lt/Lb)^{(1/2)}$ of (Lt/Lb) and inputs the square root $(Lt/Lb)^{(1/2)}$ in the reciprocal operation circuit 44. The reciprocal operation circuit 44 calculates the inverse of $(Lt/Lb)^{(1/2)}$ (namely, $(Lb/Lt)^{(1/2)}$), and inputs the calculated result in the multiplication circuit 45. An inclination k in the first torque correction information 51 is also input in the multiplication circuit 45.

The multiplication circuit 45 multiplies the k by $(Lb/Lt)^{(1/2)}$, and inputs the calculated result in the adder circuit 46. Torque offset b is also input in the adder circuit 46. The adder circuit 46 adds $k \times (Lb/Lt)^{(1/2)}$ to b. The $k \times (Lb/Lt)^{(1/2)} + b$ is the torque correction value (y). The adder circuit 46 inputs the calculated torque correction value in the multiplication circuit 47. The velocity V1 of the head H is also input in the multiplication circuit 47. The multiplication circuit 47 calculates the velocity V2 by multiplying the velocity V1 by the torque correction value y, and outputs the velocity V2.

Figure 4:
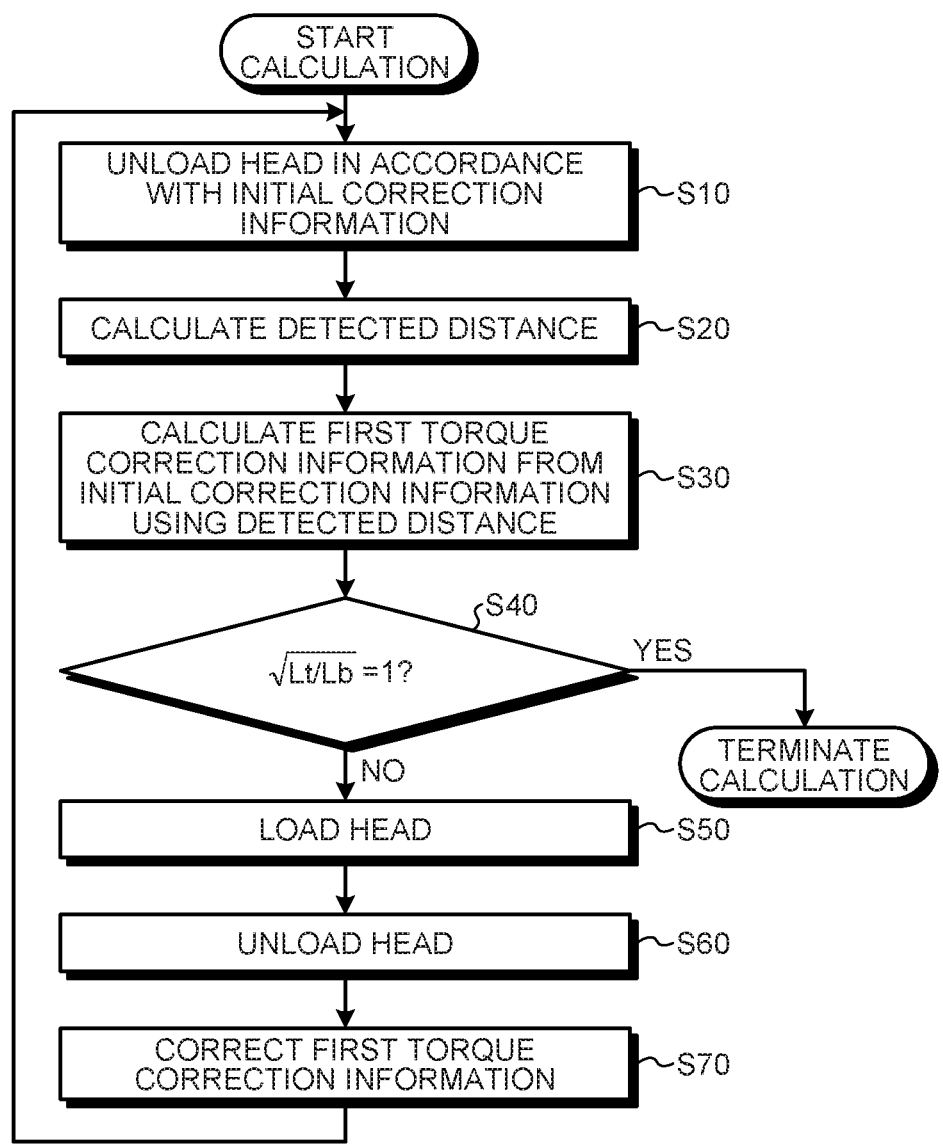
FIG. 4 is a flowchart of a process for calculating the torque correction value.

Next, a process for calculating a torque correction value will be described. FIG. 4 is a flowchart of a process for calculating a torque correction value. The disk drive 10 unloads the head H in accordance with the initial correction information 51A (S10). After that, the CPU 18 calculates the detected distance Lb (S20). The CPU 18 calculates the first torque correction information 51 from the initial correction information 51A, using the detected distance Lb (S30).

The CPU 18 determines whether the design distance Lt=the detected distance Lb holds. In other words, it is determined whether $(Lt/Lb)^{(1/2)}=1$ holds (S40). When $(Lt/Lb)^{(1/2)}=1$ does not hold, (S40, No), the disk drive 10 loads the head H on the disk 11 (S50). In such a case, the disk drive 10 moves the head H on the ramp member 26 toward the disk 11 in accordance with the first torque correction information 51. The disk drive 10 moves the head H on the disk 11 in accordance with the torque correction value (for example, the approximate expression Ci) used when the head H is on the disk 11.

Then, the disk drive 10 unloads the head H to the ramp member 26 (S60). Then, the disk drive 10 moves the head H on the disk 11 toward the ramp member 26 in accordance with the torque correction value used when the head H is on the disk 11. Furthermore, the disk drive 10 moves the head H on the ramp member 26 in accordance with the first torque correction information 51.

After the disk drive 10 unloads the head H in accordance with the first torque correction information 51, the CPU 18 calculates a new detected distance Lb. Then, the CPU 18 corrects the first torque correction information 51, using the new detected distance Lb. In the correction, the CPU 18 calculates the new first torque correction information 51 with the same process for calculating the first torque correction information 51 using the initial correction information 51A. Specifically, the CPU 18 calculates the new first torque correction information 51 by multiplying the current first torque correction information 51 by $(Lt/Lb)^{(1/2)}$. This calculation corrects the current first torque correction information 51 (S70).

Then, the CPU 18 determines whether the new design distance Lt=the detected distance Lb holds. In other words, it is determined whether $(Lt/Lb)^{(1/2)}=1$ holds for the new design distance Lt (S40). After that, the CPU 18 and the disk drive 10 repeats the process in S50 to S70, and S40 until $(Lt/Lb)^{(1/2)}=1$ holds. As described above, the process in S50 to S70, and S40 is repeated until the detected distance Lb calculated from the BEMF becomes identical to the design distance Lt.

When $(Lt/Lb)^{(1/2)}=1$ holds (S40, Yes), the CPU 18 terminates the process for calculating the first torque correction information 51. Then, the latest first torque correction information 51 calculated by the CPU 18 is written in the disk 11.

Figure 5:
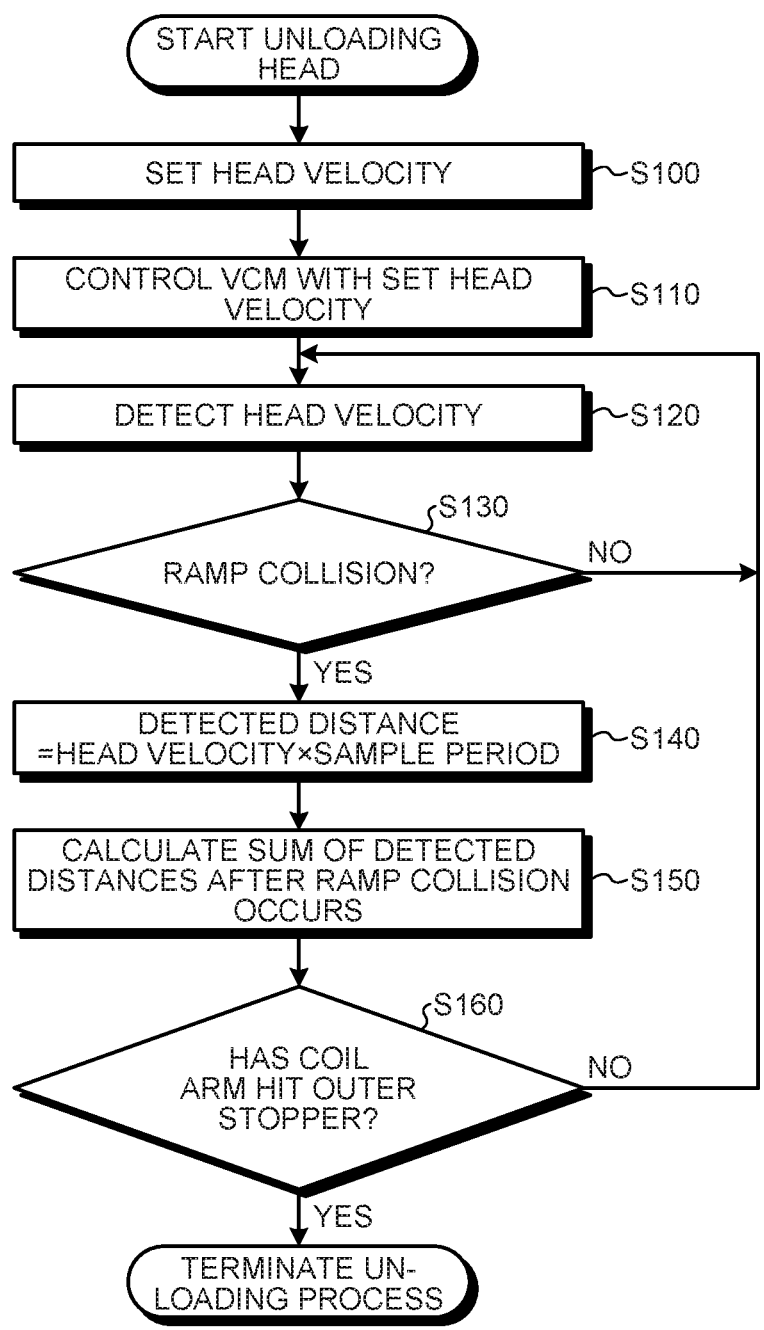
FIG. 5 is a flowchart of a process for obtaining a detected distance when the head is unloaded.

A method for obtaining the detected distance Lb when the head H is unloaded will be described next. FIG. 5 is a flowchart of a process for obtaining the detected distance when the head H is unloaded. The disk drive 10 sets the head velocity when the disk drive 10 starts unloading the head H (moving the head H on the ramp member 26) (S100). The motor driver IC 20 controls the VCM 132 in accordance with the initial correction information 51A (namely, the set head velocity) (S110). Specifically, the motor driver IC 20 extracts the torque corresponding to the position of the head H from the initial correction information 51A, and transmits the instructed voltage or current corresponding to the extracted torque to the VCM 132.

After that, the VCM 132 controls the velocity of the head H in accordance with the voltage or current instructed from the motor driver IC 20. The CPU 18 detects the head velocity when the head H moves on the ramp member 26 (S120).

The CPU 18 determines whether the head H hits the ramp member 26 (whether a ramp collision occurs) when the head H is unloaded (S130). When the head H does not hit the ramp (S130, No), the CPU 18 continues detecting the head velocity (S120). The CPU 18 determines again whether the head H hits the ramp member 26 when the head H is unloaded (S130).

When the head H reaches the start position of the first inclined portion while the head H is unloaded, the head H hits the ramp (S130, Yes). At this collision, the first deceleration of the head H is detected. At that time, the VCM 132 makes an acceleration current flow in the coil in accordance with the instruction from the motor driver IC 20. The time when the deceleration is detected or the acceleration current flows is the time T1.

After that, the velocity of the head H returns to the target velocity Ta. The CPU 18 calculates the head velocity based on the BEMF. The CPU 18 calculates the detected distance Lb by multiplying the calculated head velocity by the sample period (S140).

The CPU 18 calculates the sum of the calculated detected distances Lb after the ramp collision occurs (S150), the CPU 18 stores the sum of the detected distances Lb. The CPU 18 determines whether a coil arm placed near the VCM 132 hits an outer stopper when the head H is unloaded (S160).

When the coil arm does not reach the outer stopper (S160, No), the CPU 18 and the disk drive 10 repeats the process in S120 to S150 until the coil arm hits the outer stopper.

When the coil arm hits the outer stopper (S160, Yes), the head H decelerates again. Meanwhile, the VCM 132 makes the acceleration current flow in the coil in accordance with the instruction from the motor driver IC 20. The time when the deceleration is detected or the acceleration current flows is the time T2. Note that the ramp collision is distinguished from the outer stopper collision with the amount of deceleration or the amount of current. After the coil arm hits the outer stopper, the head H stops in the parking area on the ramp member 26. Then, the unloading of the head H is completed.

The CPU 18 calculates the sum of the head velocities detected from the time when a ramp collision occurs to the time when the coil arm hits the outer stopper and stops. The CPU 18 calculates the detected distance Lb by multiplying the sum of the head velocities by the sample periods. As described above, the CPU 18 calculates the detected distance Lb by calculating the sum of the velocities in the sample periods detected with the BEMF, and multiplying the sum by the sample periods over the time between the times T1 and T2.

Figure 6A:
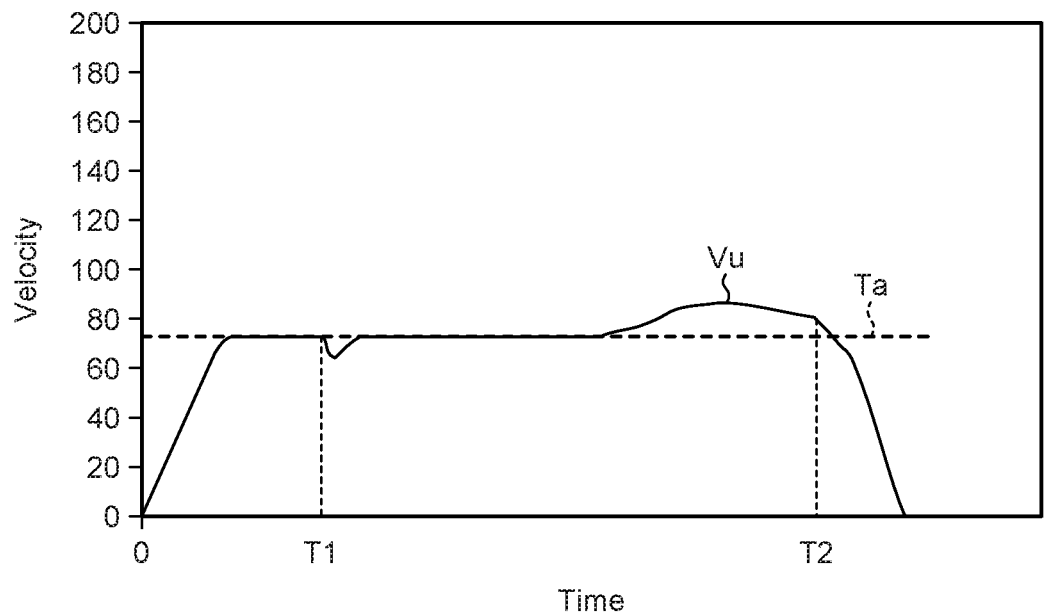
FIG. 6A is a diagram of a relationship between a target velocity of the head and an actual velocity of the head.

The relationship between the target velocity Ta of the head H and an actual head velocity will be described hereinafter. FIG. 6A is a diagram of the relationship between the target velocity Ta of the head and an actual head velocity. The time is shown on the horizontal axis of the graph illustrated in FIG. 6A, and the head velocity is shown on the vertical axis. FIG. 6A illustrates the velocity characteristic of the head H when the head H is unloaded to the ramp member 26.

The disk drive 10 preferably moves the head H at the target velocity Ta in a range in which the head H is controlled to move at a constant velocity (the period between the times T1 and T2). When the VCM 132 controls the torque without correcting the torque while the head H is unloaded, the head H moves at a velocity characteristic Vu. The velocity characteristic Vu deviates from the target velocity Ta.

Figure 6B:
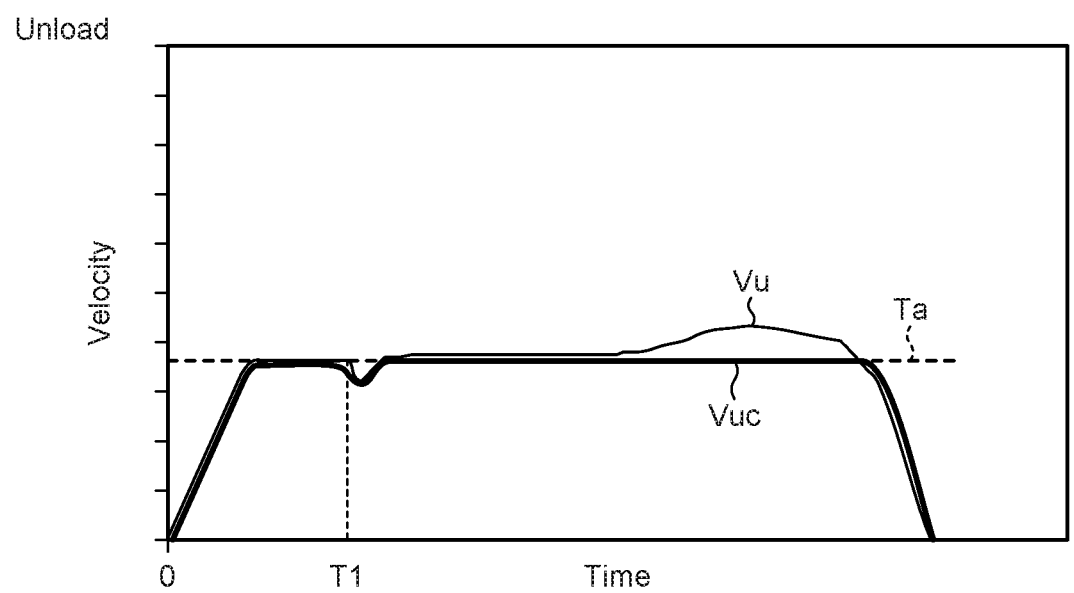
FIG. 6B is a diagram of a velocity of the head when a torque is corrected with the torque correction value of the embodiment when the head is unloaded.

The head velocity when the torque is corrected with the first torque correction information 51 will be described hereinafter. FIG. 6B is a diagram of the head velocity when the torque is corrected with the torque correction value in the embodiment when the head H is unloaded. The time is shown on the horizontal axis of the graph illustrated in FIG. 6B, and the head velocity is shown on the vertical axis. FIG. 6B illustrates the velocity characteristic of the head H when the head H is unloaded to the ramp member 26.

When the VCM 132 controls the torque with the first torque correction information 51 while the head H is unloaded, the head H moves at a corrected velocity characteristic Vuc. In such a case, the corrected velocity characteristic Vuc is more similar to the target velocity Ta than the velocity characteristic Vu.

As described above, the disk drive 10 of the present embodiment controls the torque with the initial correction information 51A when the head H is unloaded on the ramp member 26. The CPU 18 calculates the travel distance (the detected distance Lb) when the head H moves on the ramp member 26. Furthermore, the CPU 18 corrects the initial correction information 51A based on the design distance Lt and the detected distance Lb. This calculates the first torque correction information 51. When the disk drive 10 controls the torque with the first torque correction information 51 when the head H is unloaded on the ramp member 26.

This makes the head H move at the corrected velocity characteristic Vuc when the torque is controlled with the first torque correction information 51, whereas the head H moves at the velocity characteristic Vu when the torque is controlled without correcting the torque. This enables the head H to move at a constant velocity on the ramp member 26 when the head H is unloaded. The disk drive 10 makes the velocity of the head H approach a constant velocity by controlling the torque with the initial correction information 51A when the head H is unloaded. Then, the disk drive 10 makes the head H move at an approximately constant velocity by controlling the torque with the first torque correction information 51.

Figure 6C:
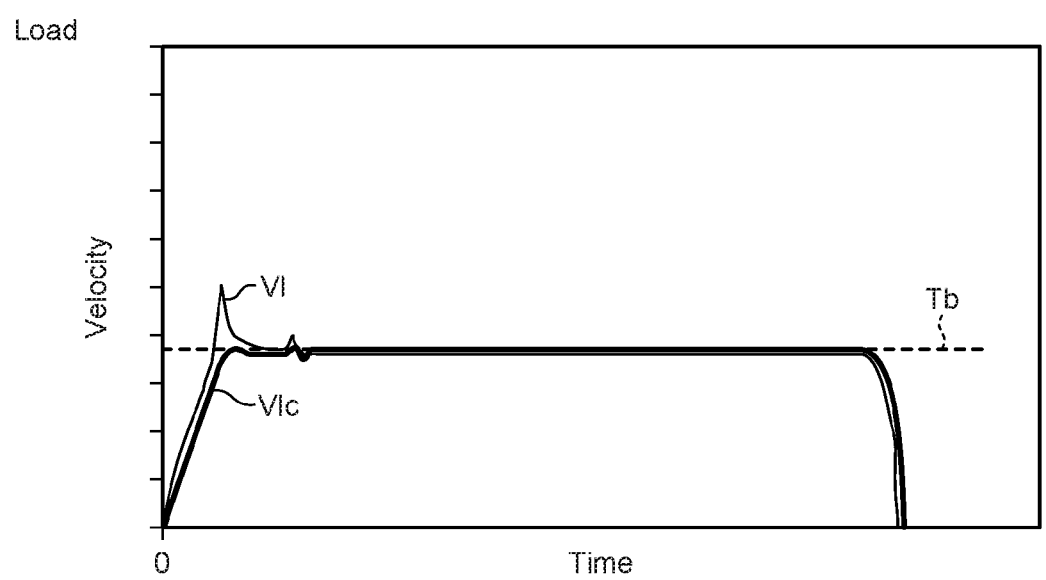
FIG. 6C is a diagram of a velocity of the head when the torque is corrected with the torque correction value of the embodiment when the head is loaded.

FIG. 6C is a diagram of the head velocity when the torque is corrected with the torque correction value in the embodiment when the head H is loaded. The time is shown on the horizontal axis of the graph illustrated in FIG. 6C, and the head velocity is shown on the vertical axis. FIG. 6C illustrates the velocity characteristic of the head H when the head H is loaded from on the ramp member 26.

The disk drive 10 controls the head H to move at a target velocity (for example, the target velocity Ta) in a range in which the head H is controlled to move at the constant velocity. When the VCM 132 controls the torque without correcting the torque while the head H is loaded, the head H moves at a velocity character Vl.

In such a case, the velocity character Vl deviates from a target velocity Tb. On the other hand, when the VCM 132 controls the torque with the first torque correction information 51 while the head H is loaded, the head H moves at a corrected velocity character Vlc. The corrected velocity character Vlc in such a case is more similar to the target velocity Tb than the velocity character Vl.

As described above, the disk drive 10 of the present embodiment controls the torque with the first torque correction information 51 when the head H is loaded from on the ramp member 26. This makes the head H move at the corrected velocity character Vlc when the torque is controlled with the first torque correction information 51, whereas the head H moves at the velocity character Vl when the torque is controlled with the initial correction information 51A. This enables the head H to move at a constant velocity on the ramp member 26 when the head H is loaded. As described above, controlling the torque with the initial correction information 51A when the head H is loaded makes the velocity of the head H approach the constant velocity. Controlling the torque with the first torque correction information 51 makes the head H move at an approximately constant velocity.

FIG. 7 is a flowchart of a process for manufacturing the disk drive according to the embodiment. When the disk drive 10 is manufactured, the disk drive 10 is assembled (S210) and the assembling of the disk drive 10 is completed (S220). Then, the CPU 18 calculates over-the-medium torque correction values for the disk drive 10 (S230). The over-the-medium torque correction values are the second torque correction information 52 in the embodiment. The over-the-medium torque correction values are a correction value calculated based on the torque measured when the head H is on the disk 11. The over-the-medium torque correction values are used to correct the torque when the head H moves across the disk 11 (is loaded or is unloaded).

The CPU 18 calculates on-the-ramp torque correction values for the disk drive 10 (S240). The on-the-ramp torque correction values are the first torque correction information 51 in the embodiment. Thus, the on-the-ramp torque correction values (the first torque correction information 51) are used to correct the torque when the head H moves on the ramp member 26 (is loaded or is unloaded).

To calculate the first torque correction information 51, the design distance Lt of the head H is prepared. The CPU 18 actually unloads the head H and calculates the detected distance Lb based on the head velocity measured during the actual unloading. Then, the CPU 18 adjusts the initial correction information 51A based on the ratio of the design distance Lt to the detected distance Lb. This calculates the first torque correction information 51.

The calculated first torque correction information 51 (the on-the-ramp torque correction values), and second torque correction information 52 (the over-the-medium torque correction values) are stored in a non-volatile storage device of the disk drive 10 (S250). The disk drive 10 performs a test of the reading and writing of data from and to the disk 11 (S260). Specifically, the disk drive 10 writes data to the disk 11 and reads data from the disk 11. After the test is completed, the disk drive 10 unloads the head H in accordance with the stored first torque correction information 51 (S270).

After that, the disk drive 10 is shipped. When the disk drive 10 is used, the disk drive 10 controls the current or voltage to be supplied to the VCM 132 with the first torque correction information 51 and the second torque correction information 52. Specifically, when the disk drive 10 is powered on, the first torque correction information 51 and the second torque correction information 52 in the disk drive 10 are read into the RAM 15. Then, the motor driver IC 20 controls the VCM 132, using the first torque correction information 51 and the second torque correction information 52 in the RAM 15. Specifically, the motor driver IC 20 controls the VCM 132 using the first torque correction information 51 when the head H moves on the ramp member 26 while the head H is loaded. The motor driver IC 20 controls the VCM 132 using the second torque correction information 52 when the head H moves across the disk 11 while the head H is loaded. On the other hand, the motor driver IC 20 controls the VCM 132 using the second torque correction information 52 when moves across the disk 11 while the head H is unloaded. The motor driver IC 20 controls the VCM 132 using the first torque correction information 51 when the head H moves on the ramp member 26 while the head H is unloaded. These controls make the VCM 132 adjust the amount of current or voltage to be supplied to the coil of the VCM 132 so that the amount is in accordance with the first torque correction information 51 and the second torque correction information 52.

Note that the disk drive 10 can use the initial correction information 51A (the over-the-medium torque correction value) such as the approximate expression C0 to control the VCM 132 when the head H is loaded. In such a case, the initial correction information 51A is stored in the non-volatile storage unit in the disk drive 10.

In the present embodiment as described above, the first torque correction information 51 is calculated based on the ratio of the design distance Lt to the detected distance Lb. Thus, the torque when the head H is unloaded can properly be corrected. As a result, the velocity of the head H is stably controlled on the ramp member 26 when the head H is loaded and when the head H is unloaded.

This enables the disk drive 10 to accurately control the loading and unloading of the head H on the ramp member 26. This accurate control can reduce the possibility that the head H hits the disk 11 near the first inclined portion of the ramp member (the end of the ramp facing the disk 11) when the head H is loaded. This accurate control can also prevent the head H from hitting the ramp member 26 when the head H is unloaded. This can reduce the contaminants and noise caused by the collision.

Note that the disk drive 10 can further correct the first torque correction information 51 in accordance with the temperature detected by the temperature sensor 25. In the present embodiment, the initial correction information 51A and the first torque correction information 51 are a quadratic approximate expression. However, the initial correction information 51A and the first torque correction information 51 can be an approximate expression of degree M (M is a natural number larger than or equal to one or three). In such a case, for example, the first torque correction information 51 is found by multiplying the initial correction information 51A by $(Lt/Lb)^{(1/M)}$.

In the present embodiment as described above, the disk drive 10 actually unloads the head H using the initial correction information 51A, and calculates the detected distance Lb based on the head velocity during the actual unloading. The disk drive 10 calculates the ratio of the detected distance Lb to the design distance Lt measured by the measuring instrument. Furthermore, the disk drive 10 corrects the initial correction information 51A with the calculated ratio, and calculates the first torque correction information 51. By using the first torque correction information 51, the disk drive 10 can accurately correct the torque exerted on the coil used to drive the head H. This enables the disk drive 10 to accurately control the head H at a desired velocity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A correction value calculating method comprising:
   obtaining a first distance that is a distance actually traveled by a head on a ramp member while the head is unloaded;
   obtaining a first torque value exerted on a coil when the head is unloaded, the coil being used to drive the head, the first torque value being obtained while the head moves on the ramp member;
   generating a first correction value used to correct the first torque value;
   actually unloading the head with the first correction value;
   obtaining a second torque value exerted on the coil when the head is actually unloaded, the second torque value being obtained while the head moves on the ramp member;
   calculating a second distance based on the second torque value, the second distance being a distance traveled by the head; and
   calculating a second correction value based on the first correction value, and a ratio of the first distance to the second distance, the second correction value being used to correct the second torque value.

2. The method according to claim 1, wherein
   the first correction value is generated based on a third correction value used to correct a velocity of the head, and the third correction value is obtained when the head moves across a disk.

3. The method according to claim 1, wherein
   a predetermined adjustment value is added to the second correction value when the head moves in a range from a boundary between the disk and the ramp member to a predetermined position on the ramp member.

4. The method according to claim 1, further comprising:
generating correction information that indicates a relationship between the first correction value and a position of the head; and
generating the first correction value in accordance with the correction information.

5. The method according to claim 4, wherein
the correction information is an approximate expression or a table generated based on the first torque value.

6. The method according to claim 1, wherein
the second distance is calculated with a velocity of the head.

7. The method according to claim 6, wherein
the velocity of the head is calculated based on back electromotive force of a voice coil motor that includes the coil.

8. The method according to claim 1, wherein
the second distance is calculated based on a period from a time when a tab reaches the ramp member to a time when a coil arm hits an outer stop while the head is unloaded.

9. The method according to claim 1, wherein
the second distance is a time obtained by integrating a velocity of the head over the period.

10. The method according to claim 1, wherein
the second correction value is set so that the head moves at a constant velocity.

11. The method according to claim 1, wherein
the second distance is calculated based on a time when a velocity of the head varies, or a time when an acceleration current used to accelerate the head flows.

12. The method according to claim 1, further comprising:
unloading the head again with the second correction value;
obtaining a third torque value exerted on the coil when the head is unloaded again, the third torque value being obtained while the head moves on the ramp member;
calculating a third distance with the third torque value, the third distance being a distance traveled by the head; and
calculating a fourth correction value based on the second correction value, and a ratio of the first distance to the third distance, the fourth correction value being used to correct the third torque value.

13. The method according to claim 12 further comprising:
repeating until the ration becomes one, a process in which the head is unloaded again, a process in which the third torque value is obtained, a process in which the third distance is calculated, and a process in which the fourth correction value is calculated.

14. A manufacturing method of a disk drive, the method comprising:
assembling the disk drive;
obtaining a first distance that is a distance traveled by a head on a ramp member while the head is unloaded;
obtaining a first torque value exerted on a coil when the head is unloaded, the coil being used to drive the head, the first torque value being obtained while the head moves on the ramp member;
generating a first correction value used to correct the first torque value;
actually unloading the head with the first correction value;
obtaining a second torque value exerted on the coil when the head is actually unloaded, the second torque value being obtained while the head moves on the ramp member;
calculating a second distance based on the second torque value, the second distance being a distance traveled by the head;
calculating a second correction value based on the first correction value, and a ratio of the first distance to the second distance, the second correction value being used to correct the second torque value; and
storing the calculated second correction value in a nonvolatile storage unit in the disk drive.

15. The method according to claim 14, wherein
the first correction value is generated based on a third correction value used to correct a velocity of the head, and the third correction value is obtained when the head moves across a disk.

16. The method according to claim 14, further comprising:
generating correction information that indicates a relationship between the first correction value and a position of the head; and
generating the first correction value in accordance with the correction information.

17. The method according to claim 14, wherein
the second distance is calculated with a velocity of the head.

18. The method according to claim 14, wherein
the second distance is calculated based on a period from a time when a tab reaches the ramp member to a time when a coil arm hits an outer stop while the head is unloaded.

19. The method according to claim 14, wherein
the second correction value is set so that the head moves at a constant velocity.

20. A disk drive comprising:
a head;
a ramp member;
a motor that includes a coil used to drive the head;
a first storage region in which a first correction value used to correct a first torque value is stored, the first torque value being used when the head moves across the disk;
a second storage region in which a second correction value used to correct a second torque value is stored, the second torque value being a torque exerted on the coil while the head is unloaded from the disk toward the ramp member and being used while the head moves on the ramp member; and
a control circuit that controls a driving of the head with the first correction value and the second correction value according to a function indicating a relationship between the second torque value and a position of the head that is identical to a function indicating a relationship between the first torque value and a position of the head.

* * * * *